Nov. 21, 1961   H. A. GELMAN   3,009,733
BABY WALKER
Filed June 1, 1960

INVENTOR.
HARRY A GELMAN
BY
Soans, Anderson, Luedeka & Fitch
ATTYS.

United States Patent Office 3,009,733
Patented Nov. 21, 1961

3,009,733
BABY WALKER
Harry A. Gelman, Chicago, Ill., assignor to Comfort Lines, Inc., a corporation of Illinois
Filed June 1, 1960, Ser. No. 33,168
2 Claims. (Cl. 297—5)

The present invention relates generally to baby walkers, and is particularly directed to an improved form of lightweight, collapsible baby walker.

It is a principal object of this invention to provide a novel and improved form of baby walker which is neat in appearance, simple and economical to construct, and which permits collapsing of the walker to a compact arrangement for storage or transporting. Other objects and advantages will be apparent from the following description of a selected embodiment of the invention, which is illustrated in the accompanying drawings, wherein.

Figure 1:
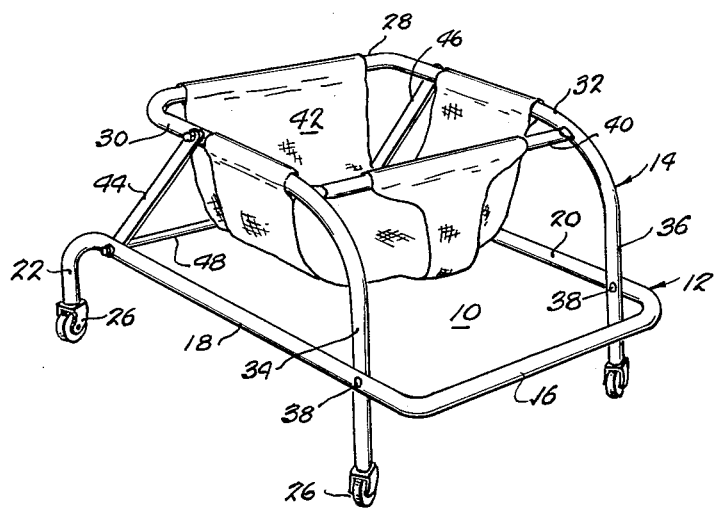
FIGURE 1 is a perspective view of a baby walker incorporating features of the invention.
Figure 2:
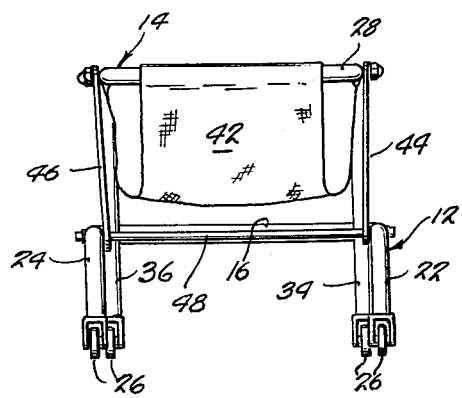
FIGURE 2 is a rear view of the walker.

With reference to the drawings, it will be seen that the selected embodiment of the invention comprises a baby walker 10 formed generally of two U-shaped frame members 12 and 14, which are made of lightweight metal tubing, or the like. The U-shaped member 12 provides the base frame for the walker, and this base frame includes a forwardly disposed bight portion 16 and a pair of rearwardly extending leg members 18 and 20 which are generally parallel and coextensive in length. The free ends of the leg members 18 and 20 are turned downwardly, as indicated at 22 and 24, and are provided with casters 26, or other suitable wheel members, to provide rolling support at the rear of the walker. The other U-shaped frame member 14 has its bight portion 28 disposed above the base frame and generally rearwardly along the walker structure. The leg members 30 and 32 of this upper frame section 14 extend forwardly and then downwardly and terminate in end portions on which are suitably mounted a forward pair of the casters 26, or the like, to thereby complete the four-wheel rolling support for the baby walker.

The downwardly extending end portions 34 and 36 of the upper U-shaped frame member 14 are pivotally connected, respectively, as by suitable means such as a rivet 38, screw, or the like, with the leg members 18 and 20 of the base frame 12 at positions therealong adjacent the forwardly disposed bight portion 16 of this frame member. The downwardly extending end portions 34 and 36 of the upper frame member are also preferably disposed within the U of the base frame member 12, in order that the bight 16 and leg members 18 and 20 of the latter thereby provide a generally smooth bumper for the baby walker, which extends uninterruptedly across the front and along the opposite sides of the walker. In this respect, the base frame 12 may be coated with plastic, rubber, or the like, to further avoid marring furniture and provide a cushion for the bumper.

Intermediate the ends of the leg members 30 and 32 on the upper frame 14, there is connected a transverse member 40 which is generally parallel to and in the plane of the bight portion 28. In the illustrated embodiment, the ends of this transverse member 40 are flattened and inserted into slots provided in the side of the leg members, preferably at the time the U-member 14 is formed, in order to securely fasten the transverse member in place. A seat 42 is supported on the upper frame by the transverse member 40, the bight portion 28, and the portions of the leg members 30 and 32 which are intermediate the bight and transverse member. This seat is preferably of flexible sheet material, such as plastic, canvas or the like, and may, if desired, be provided along its outer edges with snap fasteners or the like, to permit replacement of the seat on the frame structure.

Figure 3:
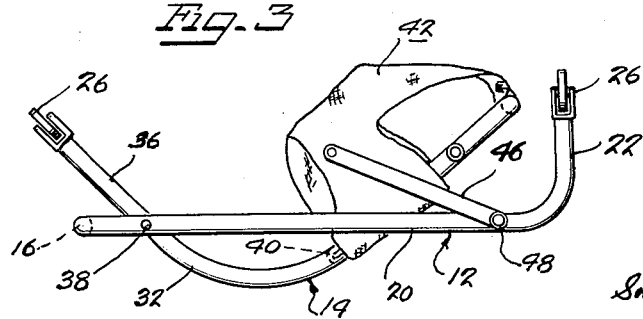
FIGURE 3 shows the baby walker in its collapsed condition.

The seat supporting upper frame 14 is held in elevated relation to the base frame 12 by means of a pair of braces 44 and 46, which are detachably connected, respectively, at opposite sides of the baby walker at positions extending between the rear end portion of the base frame 12 and the rear portion of the upper frame 14. More particularly, there is preferably provided a cross rod 48 between the rear end portions of the legs 18 and 20 of the base frame 12, and the braces 44 and 46 are pivotally mounted at one end on this cross rod. The cross rod 48 also serves as a rear bumper for the walker, preventing engagement between the rear of the walker and objects in the path of a retreating child. In order to collapse the baby walker for storage or easier transporting, it is only necessary to disconnect one end of each brace member, by removal of a screw and nut or the like, and thereby permit pivoting of the upper frame 14 about the pivot connections 38, so that the walker assumes the collapsed position seen in FIGURE 3.

Although shown and described with respect to particular structural arrangements and materials, it will be apparent that various modifications might be made without departing from the principles of this invention.

I claim:

1. A baby walker comprising a pair of U-shaped frame members, one of said U-shaped frame members providing a base frame and bumper for the walker and having the end portions of its leg members bent at an angle with respect to the plane of the remainder of said U-shaped member, the other of said U-shaped frame members also having end portions of its leg members disposed at an angle with respect to the plane of the remainder of said other U-shaped members, means pivotally connecting said one frame member at positions thereon adjacent the juncture of its leg members and its bight with positions on said other frame member along said end portions thereof, said other U-shaped member being disposed within said one U-shaped member and having its bight portion and the adjacent portions of its leg members disposed generally in a horizontal plane, a pair of bracing means extending, respectively, between each of the leg members of said one U-shaped frame member and said other U-shaped frame member at a position on the latter adjacent its bight portion, and a seat supported on said other U-shaped frame member in position whereby the bight portion of the base frame member is forward on the walker and the bight portion of said other U-shaped frame member is rearward on the walker.

2. A collapsible baby walker comprising a pair of U-shaped frame members, one of said U-shaped frame members comprising a generally horizontal base frame with the bight portion disposed forwardly on the walker, and with end portions of the legs of said one U-shaped frame member being bent downwardly, a caster wheel rotatably mounted at the lower end of said downwardly bent leg end portions, the other of U-shaped frame members comprising a seat supporting frame with the bight portion thereof disposed rearwardly on the walker and the leg portions thereof extending forwardly and then downwardly, means pivotally connecting the downwardly extending portions of said other frame members with the leg members of said one frame member at a position within the latter and adjacent the juncture of said leg members with the forwardly disposed bight portion of said one frame member, a caster wheel rotatably mounted at the lower end of said downwardly extending portions of said other frame member, a transverse member joining the leg portion of said other frame member at a position spaced from the bight portion thereof along the forwardly extending leg portions of said other frame member, a seat supported on said other frame member by said bight and leg portions thereof and by said transverse member, a cross member extending between the rear end portions of said one U-shaped frame member, and a pair of brace members pivotally mounted on said cross member and detachably connected at their free ends with a rear portion of said other U-shaped frame member adjacent the opposite sides thereof.

References Cited in the file of this patent

UNITED STATES PATENTS

| | | |
|---|---|---|
| 2,168,513 | Cobb | Aug. 8, 1939 |
| 2,678,219 | Goodman | May 11, 1954 |
| 2,798,733 | Gill | July 9, 1957 |